March 6, 1962 G. R. SCHAER 3,024,148

METHODS OF CHEMICALLY POLISHING GERMANIUM

Filed Aug. 30, 1957

INVENTOR.
GLENN R. SCHAER

BY Orrin M. Haugen

ATTORNEY

United States Patent Office 3,024,148
Patented Mar. 6, 1962

3,024,148
METHODS OF CHEMICALLY POLISHING GERMANIUM

Glenn R. Schaer, Columbus, Ohio, assignor, by mesne assignments, to Minneapolis-Honeywell Regulator Company, Minneapolis, Minn., a corporation of Delaware Filed Aug. 30, 1957, Ser. No. 681,341
2 Claims. (Cl. 156—17)

Figure 1:
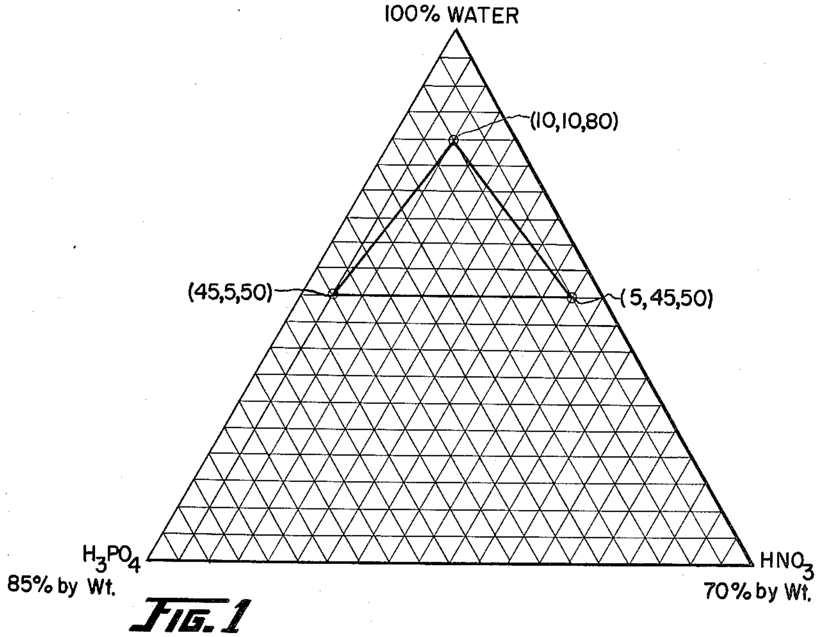

The present invention relates to etching solutions and more specifically relates to improved etching solutions designed and adapted to be used in connection with germanium semiconductor elements, these solutions having a more uniform and more readily controllable etching action than those which have been available heretofore.

According to the present invention, the improved etching solutions include an oxidizing agent such as nitric acid, and also include an etching modifier containing a phosphate ion, such as phosphoric acid. The improved etching solutions may also include hydrogen fluoride, this material being useful when it is proposed to etch materials at room temperature. The use of the phosphate provides an improved etching action, the solution being capable of providing mirror-like surfaces on germanium semiconductor bodies without pitting, particularly when having certain preferred single-crystalline orientations. Furthermore, the use of my improved solution provides for greater ease of control during etching operations, the etching action proceeding uniformly along the entire extent of the faces of relatively large wafers of germanium. When it is desirable to utilize automatic machinery for etching, such as tumbler drums or the like, the viscosity and density characteristics of the etching solution may be appropriately modified by the addition of a certain phosphate salt, specifically aluminum phosphate. When these improved solutions are utilized in semiconductor device preparation, it has been found that decreased surface leakages are obtainable with devices prepared with my solutions as compared to those prepared with solutions known and used in the art today. It is further possible to uniformly and controllably etch germanium bodies having dimensions of up to one inch on a major side.

In addition to chemically polishing the wafers prior to an alloying step, the etching solutions described herein find particular utility in etching subsequent to alloying. It has been found that these solutions provide improved results when utilized in connection with indium alloyed junction transistors, the alloyed portions acquiring a high degree of definition when the alloyed wafer has been etched in these solutions. The surface leakage of indium alloyed junction semiconductor devices is substantially depressed when the wafers have been treated in accordance with the solutions of the present invention.

Therefore, it is an object of the present invention to provide an improved etching solution which has uniform and relatively easily controllable etching action on germanium semiconductor surfaces.

It is a further object of the present invention to provide an improved etching solution which has a controlled viscosity and density appropriate for mechanical etching or tumbling of germanium semiconductor wafers.

It is still another object of the present invention to provide an improved etching solution having preferential etching action on various crystalline orientations.

It is yet another object of the present invention to provide improved etching solutions which yield semiconductor devices having improved electrical characteristics in the form of decreased surface leakage and other surface effects.

Figure 2:
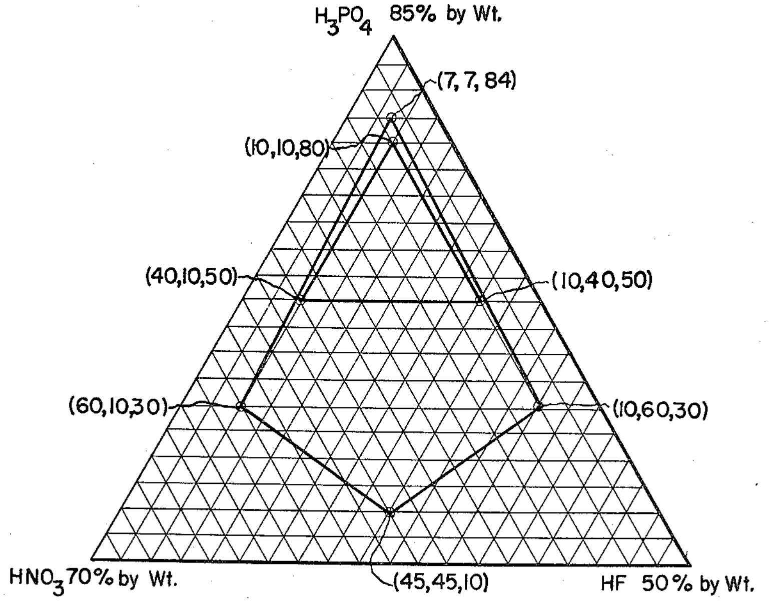

Other and further objects of the present invention will become apparent upon a study of the following specification, appended claims, and accompanying drawings, wherein:

FIGURE 1 is a graph illustrating a preferred composition range for an etching solution according to the present invention containing nitric acid, phosphoric acid and water; and FIGURE 2 is a graph illustrating a preferred composition range for an etching solution including nitric acid, hydrofluoric acid, and phosphoric acid.

According to the preferred modification of the present invention, phosphoric acid is added to a nitric acid-hydrofluoric acid solution. This solution is graphically represented in FIGURE 2 of the accompanying drawings and the range of composition shown therein. Compositions within the confines of the large polygon are suitable, while those within the smaller triangular area are particularly desirable. The triangular area defines a certain narrow range of solution which has been further particularly suited for germanium semiconductor devices having a 1, 0, 0 crystalline orientation according to the Miller index system, these bodies having a wafer-like configuration with a pair of major surfaces. Various compositions are shown in Table 1 below:

*Table 1*

| Example No. | Solution constituents, ml | | | Temperature, ° F. | Time, minutes |
|---|---|---|---|---|---|
| | $H_3PO_4$, 85% | $HNO_3$, 70% | HF, 50% | | |
| 1 | 70 | 15 | 15 | 90 | 20 |
| 2 | 50 | 75 | 40 | 90 | 2 |
| 3 | 40 | 40 | 40 | 80 | 2 |
| 4 | 80 | 40 | 40 | 80 | 2 |

The specific solution described in Example 1 above has been found to give good results when the etching action is carried out at substantially room temperature. The action is relatively uniform across the surface of the germanium crystal, does not form undesirable pits thereon, and provides a highly mirrored finished surface. It has been found that for a germanium wafer having dimensions of about one inch on the side and a thickness in the range of 15 mils, having been prepared by slicing on a diamond saw and ground on an optical lap, such as is commonly done in the art today, an etching time of about 20 minutes is required to obtain uniform mirror-like surfaces together with a reduced thickness of under about 10 mils. Although this etch is most highly suited and useful for germanium crystals having Miller indices of 1, 0, 0 along the major surfaces thereof, it has also found utility for crystals having a 1, 1, 1 orientation. The solutions of Table 1 may be utilized with agitation being accomplished through stirring of the solution, through moving the dice in the solution, or by other suitable means.

Example 2 illustrates a solution which yielded an excellent luster, and very few scattered pits. Some grooves in the surface were found due to gas streaks when no agitation was employed during etching.

The composition of Example 3 produced a fine mirror-like surface on germanium without agitation.

The composition of Example 4 produced a good surface on germanium with hand stirring.

Acetic acid, bromine, or both may be included in various amounts in the compositions of Examples 1 through 4, these materials being well known and widely used in the semi-conductor etching art.

Reference is made to FIGURE 1 of the accompanying drawings wherein etching solutions arranged to be used on germanium at elevated temperatures are graphically presented. Accordingly, specific solutions within the range of composition are shown in Table 2 below.

*Table 2*

| Example No. | Solution constituents, ml. | | | Temperature, ° F. | Time, minutes |
|---|---|---|---|---|---|
| | $HNO_3$, 70% | $H_3PO_4$, 85% | $H_2O$ | | |
| 5 | 45 | 5 | 50 | 190 | 10 |
| 6 | 17.5 | 17.5 | 65 | 190 | 30 |
| 7 | 45 | 5 | 150 | { 190<br>180 | 10<br>4 |
| 8 | 25 | 75 | 100 | { 200<br>212 | 5<br>4 |
| 9 | 20 | 20 | 160 | 210 | 30 |

Thus, the phosphoric acid is included in the solution of nitric acid and water wherein the ratio of $HNO_3/H_2O$ ranges from about 1:20 to about 1:1, the phosphoric acid being included in an amount ranging from 5% to 45% of the solution. These solutions are useful in connection with germanium bodies having any of the various crystalline orientations.

Accordingly, Example 5 defines a solution which may be used at an elevated temperature, however the results indicate that in the absence of agitation a white salt film is formed on the surface. Accordingly, this film may be removed under proper agitation conditions. The etching action is, however basically uniform.

Example 6 shows an etching solution which provides a uniform etching action on germanium crystal when finished having a somewhat frosted but otherwise uniform finish.

Example 7 illustrates a solution useful on germanium bodies at an elevated temperature, the solution yielding a somewhat frosted appearance on the surface of the germanium but the etching action is basically substantially uniform.

The solution disclosed in Example 8 was used at the various indicated temperatures. The preferred method of using such a solution is with relatively high agitation, the agitation being uniform throughout the extent of the germanium body. With this solution, a lustrous finish was possible to achieve even in the absence of agitation. According to the degree of etching utilized and the time requirements, those skilled in the art will be able to select the most desirable temperature. The etching reaction is, of course, carried out at an accelerated rate with an increase in temperature, however, the action is basically uniform at each of the various temperature levels utilized.

In Example 9, there is shown a solution which yields a somewhat frosted appearance on germanium with no agitation. Some small round pits were also found on the germanium body, however, as previously stated in connection with other solutions herein, this may be remedied by appropriate agitation of the solution or body.

When it is desired to match the density and viscosity characteristics of an etching solution to the crystal bodies undergoing etching in order to permit mechanical tumbling of the crystal wafers, it has been found desirable to add a phosphate salt such as aluminum phosphate to the etching solution. Of course, the addition of aluminum phosphate, it will be appreciated, serves a dual function; the salt being soluble in acid solution provides the requisite phosphate ions utilized to modify the etching action, while the particular aluminum salt is added to provide the proper density and viscosity in the resulting solution. Therefore, it will be appreciated that other phosphate salts may be utilized to provide the appropriate density and viscosity characteristics of the mechanical tumbling assembly, while the particular cation involved is not deemed critical. Stated another way, various acid soluble phosphates may be utilized in various etching solutions when the particular additive yields a product having the desired viscosity and density characteristics. It has been found that the acid anhydride $P_2O_5$, may likewise be utilized to reduce the free water content and thus control the viscosity of the etching solutions at the desired etching temperatures. The relative quantity of ingredients utilized when $P_2O_5$ is employed as the rate-controlling additive is dependent upon the viscosity of the final solution desired. The phosphate ion concentration desired is within the ranges set out above.

When aluminum phosphate is utilized, the solution should be almost or completely saturated in order to obtain the slowest possible polishing rate and the appropriate density-viscosity characteristics for germanium The relative quantity of material are given in Table 3 below, this table illustrating the use of aluminum phosphate as an additive.

*Table 3*

| Component | Percent concentration | Specific gravity | Parts |
|---|---|---|---|
| $HNO_3$ | 70 | 1.42 | 50 ml. |
| HF | 50 | 1.18 | 30 ml. |
| HOAc | 100 | ---------- | 30 ml. |
| $AlPO_4$ | ---------- | ---------- | 25 grams. |

The solution described above has been found to be preferable with crystals having an orientation according to the Miller index system of 1, 1, 1.

With reference to the addition of acetic acid heretofore mentioned, the data given in Table 4 below is illustrative of a solution including such a composition.

*Table 4*

| Example No. | Solution Constituents, ml. | | | | Temperature, ° F. | Time, minutes |
|---|---|---|---|---|---|---|
| | $H_3PO_4$, 85% | $HNO_3$, 70% | HF, 50% | $HC_2H_3O_2$, 100% | | |
| 10 | 45 | 20 | 20 | 45 | 115 | 5 |
| 11 | 20 | 50 | 30 | 30 | 90 | 5 |
| 12 | 100 | 100 | 100 | 100 | 90 | 5 |

In Examples 10–12 inclusive, suitable results were achieved on 1, 1, 1 oriented germanium, the solution of Example 11 being preferred. Example 12 provided excellent results in tumbling wafers, the wafers having only a few scratches and a few very small pits, and having substantially uniform thickness. Of course, suitable quantities of acid soluble phosphate such as aluminum phosphate may be employed in these solutions. Aluminum phosphate may be employed in substantially saturated concentration.

Of course, it will be appreciated that other compositions may be utilized in accordance with the present invention and the examples given herein are for purposes of illustration only and are not to be construed as a limitation upon the scope of the invention.

I claim:

1. A method of chemically polishing germanium surfaces comprising a germanium wafer having a pair of major surfaces and having a crystal orientation along said surfaces according to the Miller index system of 1, 1, 1, said method consisting of etching said wafer in a solution consisting essentially of from 20 to 100 parts by volume of $HNO_3$ (70%), from 20 to 100 parts by volume of HF (50%), and from 30 to 100 parts by volume of HOAc (100%), said solution being substantially saturated with $AlPO_4$.

2. A method of chemically polishing germanium surfaces comprising a germanium wafer having a pair of major surfaces and having a crystalline orientation, said method including tumbling said wafers in a rotating enclosure while being immersed in a certain etching solution, said etching solution comprising from 20 to 100 parts by volume of $HNO_3$ (70%), from 20 to 100 parts by volume of HF (50%), and from 30 to 100 parts by volume of HOAc (100%), said solution being susbtantially saturated with aluminum phosphate.

References Cited in the file of this patent

UNITED STATES PATENTS

| | | |
|---|---|---|
| 2,446,060 | Pray et al. | July 27, 1948 |
| 2,593,449 | Hesch | Apr. 22, 1952 |
| 2,619,414 | Heidenreich | Nov. 25, 1952 |

| | | |
|---|---|---|
| 2,650,157 | Cochran | Aug. 25, 1953 |
| 2,653,085 | Wynne | Sept. 22, 1953 |
| 2,678,875 | Spooner | May 18, 1954 |
| 2,734,806 | Wolsky | Feb. 14, 1956 |
| 2,740,699 | Koury | Apr. 3, 1956 |
| 2,806,807 | Armstrong | Sept. 17, 1957 |
| 2,827,367 | Cox | Mar. 18, 1958 |
| 2,845,372 | Jones et al. | July 29, 1958 |
| 2,847,287 | Landgren | Aug. 12, 1958 |
| 2,849,296 | Certa | Aug. 26, 1958 |
| 2,871,110 | Stead | Jan. 27, 1959 |